S. C. DUHAMEL.
ARTIFICIAL FISH BAIT.
APPLICATION FILED JULY 26, 1919.

1,332,112.

Patented Feb. 24, 1920.

Inventor
Sidney C. Duhamel.

By Fred G. Dieterich
Attorneys

UNITED STATES PATENT OFFICE.

SYDNEY C. DUHAMEL, OF VANCOUVER, BRITISH COLUMBIA, CANADA.

ARTIFICIAL FISH-BAIT.

1,332,112.  Specification of Letters Patent.  Patented Feb. 24, 1920.

Application filed July 26, 1919. Serial No. 313,515.

*To all whom it may concern:*

Be it known that I, SYDNEY C. DUHAMEL, a citizen of the Dominion of Canada, residing at Vancouver, in the Province of British Columbia, Canada, have invented certain new and useful Improvements in Artificial Fish-Baits, of which the following is a specification.

This invention relates to an artificial bait allied to that class commonly known as a "non-spinning spoon", the object of the invention being to produce a bait of that class that more closely resembles a small fish in its general form and action in the water.

Figure 1:
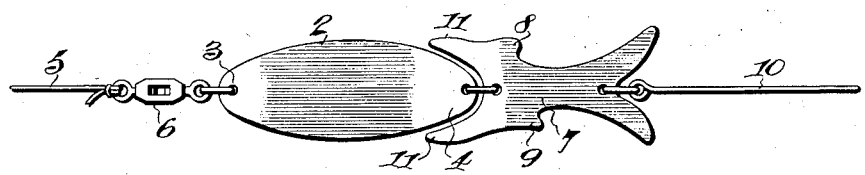

The invention is particularly described in the following specification, reference being made to the drawings by which it is accompanied, in which:

Figure 1 is a side elevation, and

Figure 2:

Fig. 2, a plan view of the bait.

The device comprises an elongated oval body 2 of thin sheet metal, the ends of which are slightly bent to opposite sides, as at 3 and 4. To one end 3 the trolling line 5 is connected by a swivel 6 and a ring. At the other end a portion 7 is connected, which is of thin sheet metal and shaped to conform to the profile of the tail portion of a fish. This portion 7 is at the connection to the end 4 of the spoon cut to conform thereto, as at 11, and the after end is cut to the shape of the tail of the fish with projections 8 and 9 representing the dorsal and anal fins. To the tail end of this member 7 the hook 10 is connected.

The horns or portions 11 of the tail portion 7 where they conform to the rounded end 4 of the spoon, may be bent to either side to give that portion a lateral motion opposite to that of the spoon portion.

In action, the bait is designed to maintain a substantially upright position in the water, the curved ends 3 and 4 of the spoon allowing it to laterally deviate from side to side under the pull of the trolling line. This erratic, lateral movement of the spoon portion with the flexibly connected tail portion 7 gives the bait an appearance closely simulating that of a herring or other small fish on which the salmon prey, and it therefore forms a killing bait.

Having now particularly described my invention, I hereby declare that what I claim as new and desire to be protected in by Letters Patent, is:

1. A fish bait, comprising in combination, an elongated body portion of thin sheet metal, the ends of which are bent from the flat to opposite sides, a tail portion of thin sheet metal link-connected to one end of the body portion, a hook connected to the after end of the tail portion and a trolling line connected to the forward end of the body.

2. A fish bait, comprising in combination, a body portion of thin sheet metal shaped as an elongated oval, the ends of which are bent from the flat to opposite sides, a tail portion link-connected to one end of the body portion, one end of which tail portion conforms to the end of the body to which it is connected and is otherwise shaped to resemble the tail end of a fish, means for connecting a trolling line by a swivel to the forward end of the body, and means for connecting a hook to the after end of the tail.

In testimony whereof I affix my signature.

SYDNEY C. DUHAMEL.